United States Patent [19]

Takahashi et al.

[11] Patent Number: 5,523,634
[45] Date of Patent: Jun. 4, 1996

[54] STEPPING MOTOR

[75] Inventors: Minoru Takahashi; Jouji Matsumoto, both of Omiya; Makoto Furuichi, Saku, all of Japan

[73] Assignee: Mitsubishi Materials Corporation, Tokyo, Japan

[21] Appl. No.: 271,462

[22] Filed: Jul. 7, 1994

[30] Foreign Application Priority Data

| Jul. 8, 1993 | [JP] | Japan | .................................. 5-169422 |
| Feb. 2, 1994 | [JP] | Japan | .................................. 6-011170 |
| Mar. 9, 1994 | [JP] | Japan | .................................. 6-038916 |

[51] Int. Cl.⁶ .......................... H02K 37/14; H02K 37/00
[52] U.S. Cl. ............................... 310/49 A; 310/49 R
[58] Field of Search ............................ 310/49 R, 49 A, 310/40 MM

[56] References Cited

U.S. PATENT DOCUMENTS

| 4,553,075 | 11/1985 | Brown et al. | ............................ 318/254 |
| 5,283,487 | 2/1994 | Oki et al. | ................................ 310/49 R |
| 5,406,158 | 4/1995 | Arnold et al. | ................ 310/40 MM X |

Primary Examiner—Steven L. Stephan
Assistant Examiner—Judson H. Jones
Attorney, Agent, or Firm—Armstrong, Westerman, Hattori, McLeland & Naughton

[57] ABSTRACT

A stepping motor having a shaft with a magnet fixed coaxially thereon, a pair of bobbins of soft magnetic material fixed along the shaft at opposite ends of the magnets, A-phase and B-phase coils wound around the bobbins, yokes having bottom plate portions fixed to the end portion of each of the bobbins on the magnet side and having short pole teeth facing part of the outer peripheral surface of the magnet, long pole teeth of soft magnetic material having one end releasably connected to an end portion of each of the bobbins on a side opposite to the magnet and an other end facing an outer portion of an outer peripheral surface of the magnet; and pole-tooth supports of non-magnetic material coaxially placed to surround the outer peripheral surface of the magnet with all of the long pole teeth integrally fixed to the pole-tooth support members and the short pole-teeth releasably inserted into the pole-tooth housing section formed in the pole-tooth support members.

3 Claims, 14 Drawing Sheets

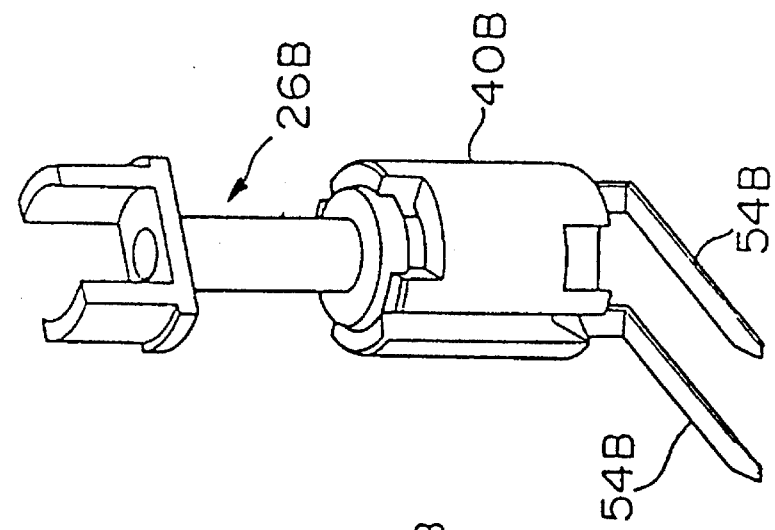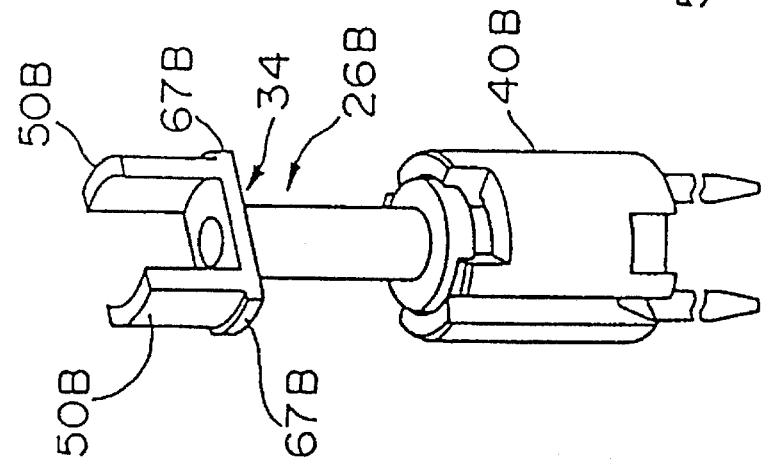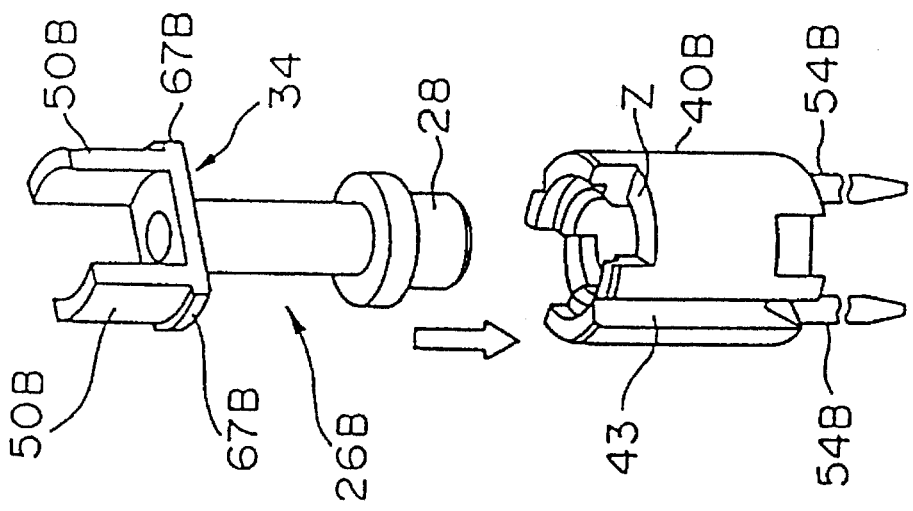

STEPPING MOTOR

FIELD OF INVENTION

The present invention relates to a small-diameter stepping motor suitable for clocks, cameras, medical equipment and the like and, more particularly, to improvements for enhancing the ease of assembly of such motor and the rotational angle accuracy thereof as well as the time and costs for the production thereof.

BACKGROUND OF THE INVENTION

As technology for decreasing the outer diameter of a stepping motor, the inventors of the present invention previously developed a stepping motor constructed as shown in FIG. 15. Such motor has bobbins 4 around which coils 6A and 6B are wound, placed at opposite sides of a magnet 2, along the axis thereof, which magnet is fixed to a shaft 1. As a result, the outer diameter of the stepping motor can be decreased to a diameter less than a conventional stepping motor having coils arranged around the outer periphery of a magnet.

Sideways U-shaped yokes 8A and 10A, and 8B and 10B are fixed, respectively, to opposite ends of each of the bobbins 4 on the outer periphery of the magnet 2 in the state in which the side plates (corresponding to pole teeth) of the yokes face each other. The yoke 8A (8B), having a long pole tooth, is out of phase by 90° from the yoke 10A (10B) having a short pole tooth. The pole teeth of the yoke, facing each other along the axis, are out of phase from each other by 45°. By supplying an electric current to the coils 6A and 6B, while the direction of the electric current is alternately changed, a rotor formed of the magnet 2 and the shaft 1 is driven in steps of 45°.

In the above-described stepping motor, the base end portions of the yokes 8A and 10A, and 8B and 10B are fixed to the bobbins 4. Therefore, there is a limitation on the accuracy of positioning between the tips of the pole teeth. There is a deviation of a position at which the rotor is stopped, caused by a deviation of the pole teeth, occurs, and causing problems, for example, making it difficult to increase the rotor rotation accuracy.

Because the yokes 8A and 10A, and 8B and 10B are small and high precision is required for the assembly thereof because of the above-described reasons, close attention must be paid to an assembly operation. Productivity is low and costs are high.

DESCRIPTION OF THE INVENTION

The present invention overcomes the above-described problems by providing a stepping motor having increased rotation accuracy, improving accuracy of positioning between the pole teeth and having increased productivity and costs.

To solve the above-described problems, the stepping motor, in accordance with a first aspect of the present invention comprises a shaft having a magnet fixed coaxially thereon; a pair of bobbins, of a soft magnetic material, placed on both sides of the magnet along the axis thereof, and coaxially to the motor shaft; A-phase and B-phase coils wound around the bobbins, respectively; yokes, with bottom plate portion fixed to the end portion of each of the bobbins on the magnet side and having short pole teeth facing a part of the outer peripheral surface of the magnet; long pole teeth, of a soft magnetic material, having one end releasably connected to the end portion of each of the bobbins on a side opposite to the magnet and the other end facing the other portion of the outer peripheral surface of the magnet; and pole-tooth support members, of a non-magnetic material, coaxially placed so as to surround the outer periphery of the magnet, wherein all the long pole teeth are integrally fixed to the pole-tooth support members, while the short pole teeth are releasably inserted into the pole-tooth housing sections formed in the pole-tooth support member, respectively.

In the stepping motor in accordance with a second aspect of the present invention, a through hole is formed in the center of the bottom plate portion of each of the yokes. The end position of each bobbin, on the magnet side, is inserted into the through hole, and a pair of engagement portions, which radially protrude outward, are formed in this end portion. These engagement portions cause the bottom plate portion of the yoke to be fixed perpendicular to the axis of the bobbin.

In the stepping motor in accordance with a third aspect of the present invention, a flange section, with which the pole support member is brought into contact and positioned, is disposed on the outer periphery of the yoke.

In the stepping motor of the present invention, because all the long pole teeth are fixed to a cylindrical pole-tooth support member beforehand, while the short pole teeth are inserted into a pole-tooth housing section formed in the pole-tooth support member, all the pole teeth are positioned accurately relative to each other by the pole-tooth support member. Therefore, the accuracy of positioning, between the pole teeth on the outer periphery of the magnet, can be increased. Thus, the accuracy of rotation of the rotor is increased.

The long pole teeth are fixed to a pole-tooth support member beforehand, while short pole teeth, which are difficult to be molded integral with the pole-tooth support member because their dimensions are small, are formed into one part as a yoke and fixed to the top of the bobbin. As a result, during the assembly of a motor, it is possible to insert short pole teeth of the yoke into the pole-tooth housing section, while holding the bobbin, and to connect the long pole teeth to the base end portion of the bobbin. A high level of positioning is possible, even though the operation is simple and easy, making it possible to increase the ease of assembly operations and productivity and reduce costs.

In addition, when the short pole teeth of the yoke are inserted into the pole-tooth housing section, the pole-tooth support member is brought into contact with the flange section formed on the outer periphery of the yoke and positioned axially.

BRIEF DESCRIPTION OF THE DRAWINGS

The invention will be more fully described and better understood from the following description taken with the appended drawings, in which

FIGS. 8A, 8B to 8C are illustrations of steps for press-fitting a bobbin into a support member and a step for bending a terminal when a stepping motor of a second embodiment is assembled;

DETAILED DESCRIPTION OF THE PREFERRED EMBODIMENTS

Figure 1:
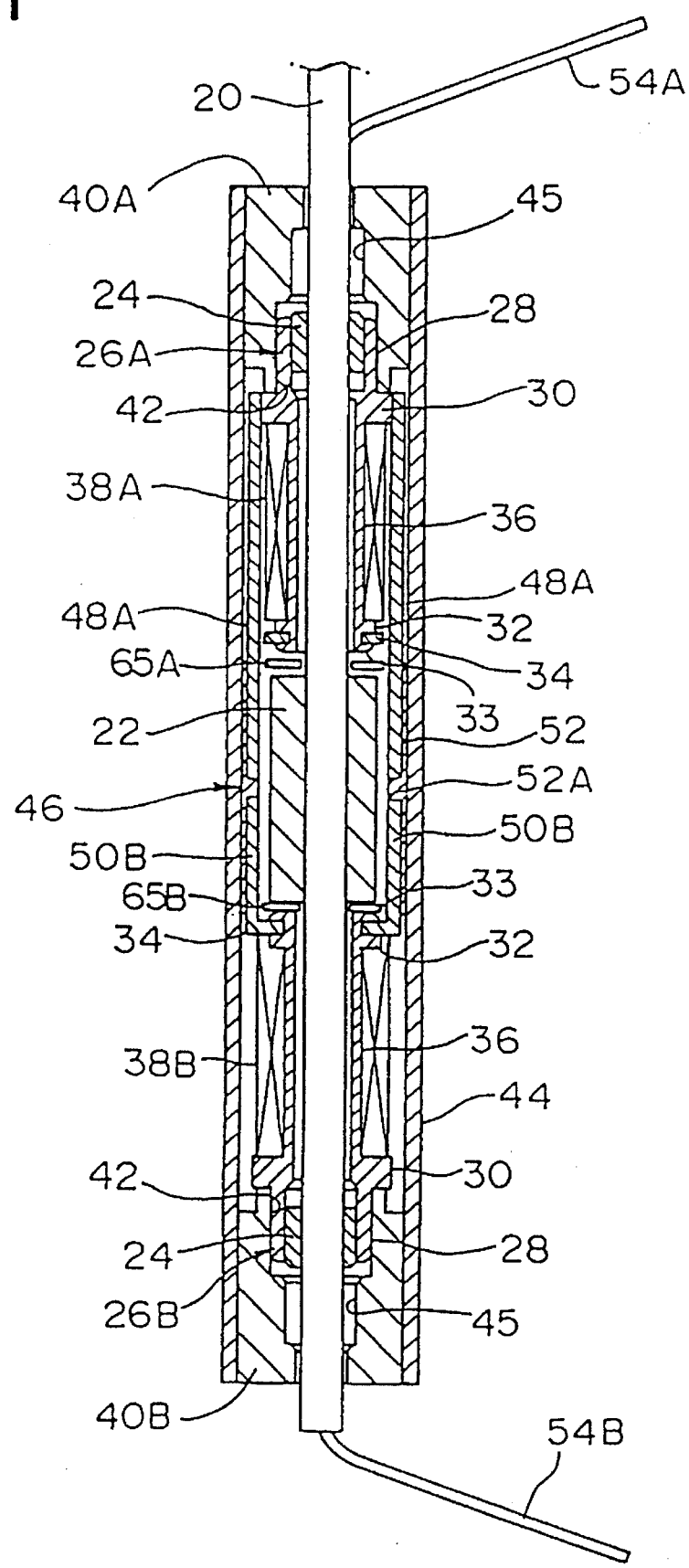
FIG. 1 is a longitudinal sectional view illustrating a first embodiment of a stepping motor in accordance with the present invention.

FIG. 1 is a longitudinal sectional view illustrating a first embodiment of a stepping motor in accordance with the present invention. Shaft 20 has a magnet 22, in the shape of a circular cylinder, circumferentially magnetized into four poles, coaxially fixed to the center of the shaft 20. A pair of bobbins 26A (A phase) and 26B (B phase), having the same shape, are positioned adjacent to opposite ends of the magnet 22, respectively, and the shaft 20 passes through the bobbins. Washers 65A and 65B for increasing the rotational slidability, are inserted at opposite ends of the magnet in such a manner as to be rotatable with respect to the shaft 20.

Figure 2:
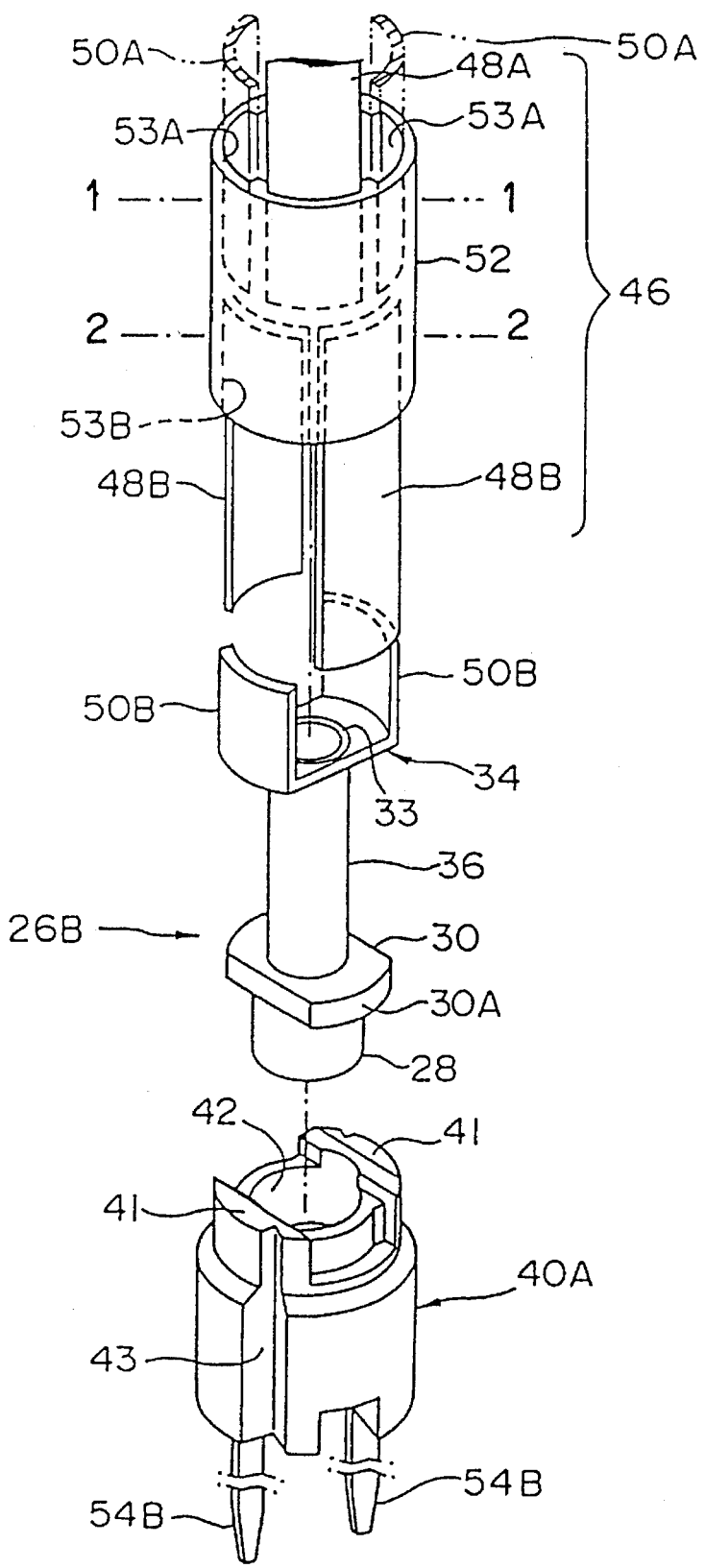
FIG. 2 is an exploded perspective view illustrating pole teeth, bobbins and a support member in accordance with the first embodiment.

Each of the bobbins 26A and 26B, as shown in FIG. 2, has a winding section 36 in the shape of a cylinder having an inner diameter larger than the outer diameter of the shaft 20, a flange section 30, formed integral in the base, and portion (on the side opposite to the magnet 22, FIG. 1, of the winding section 36, and a press-fitting projection 28 which protrudes axially from the base end portion, the whole elements being integrally formed of a soft magnetic material, such as, pure iron. Coils 38A and 38B, FIG. 1, are wound around the winding sections 36 of the bobbins 26A and 26B, respectively.

Figure 5:
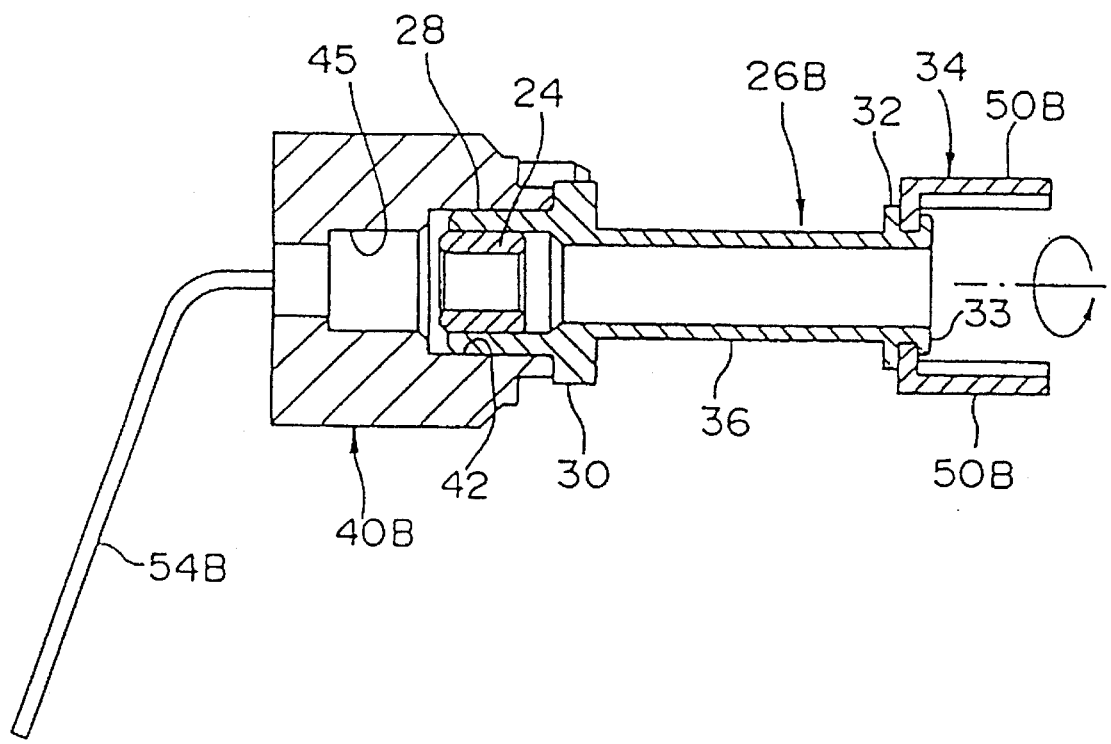
FIG. 5 is a longitudinal sectional view of the bobbins and the support member in accordance with the first embodiment.
Figure 6:
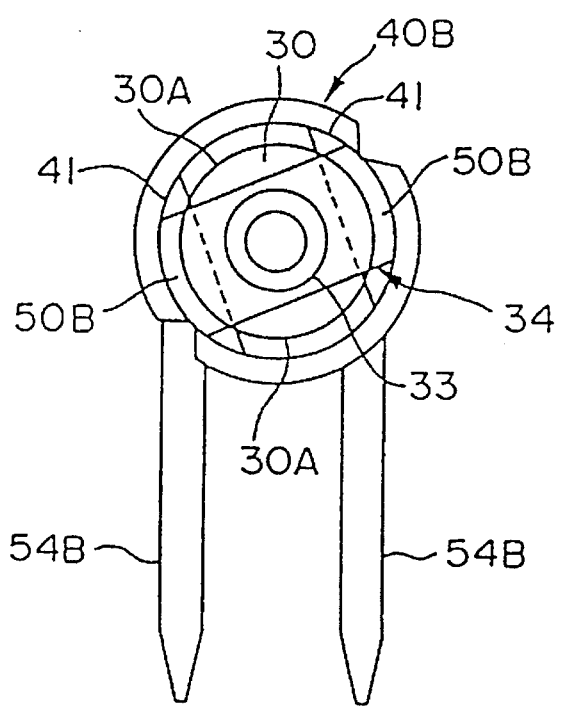
FIG. 6 is a front view of the bobbins and the support member in accordance with the first embodiment.

Yokes 34, FIG. 1, in the shape of a sideways U are mounted in the tips of the bobbins 26A and 26B. The yoke 34, formed of a soft magnetic material such as pure iron, comprises a bottom plate portion and a pair of short pole teeth 50A and 50B which extend from opposite ends thereof, a through hole being formed in the center of the bottom plate portion. As shown in FIG. 5, the tips of the bobbins 26B (26A) in which a flange section 32 (engagement section) is formed beforehand are inserted into the through hole, and the tips are crimped to form an engagement section 33. The yoke 34 is fastened between the flange section 32 and the engagement section 33 and is supported perpendicular to the axis. It is also possible to perform the crimping loosely so that the angle of the yoke 34 may be adjusted during assembly.

As shown in FIG. 2, the flange section 30 is shaped in such a way that both sides of a circular plate are cut out parallelly. A pair of pole-tooth contact surfaces 30A, with which long pole teeth 48A and 48B are brought into contact, are formed at both ends along the major axis thereof. Also, the yoke 34 is fixed in such a way that the angle from the axis is offset by 90° relative to the flange section 30, and the bobbins 26A and 26B are placed in such a way that their flange sections 30 are shifted from each other by 45°.

The press-fitting projection 28 is larger in diameter than the winding section 36 and is shaped in a cylinder form. As shown in FIG. 5, an annular bearing 24, such as a metal bearing, is coaxially press-fitted into the interior of the projection 28, so that opposite ends of the shaft 20 are rotatably supported by bearings 24, FIG. 1.

As shown in FIG. 1, a cylindrical member 46 is placed so as to coaxially surround the outer periphery in a non-contact manner. The cylindrical member 46, of a non-magnetic material, such as, a resin, as shown in FIG. 1, is formed in such a way that two sets of long pole teeth 48A and 48B are integrally fixed by a cylindrical pole-tooth support member 52. The outer diameter of the pole-tooth support member 52 is nearly equal to the inner diameter of a case 44, and the cylindrical member 46 is supported firmly inside the case 44.

Figure 4A:
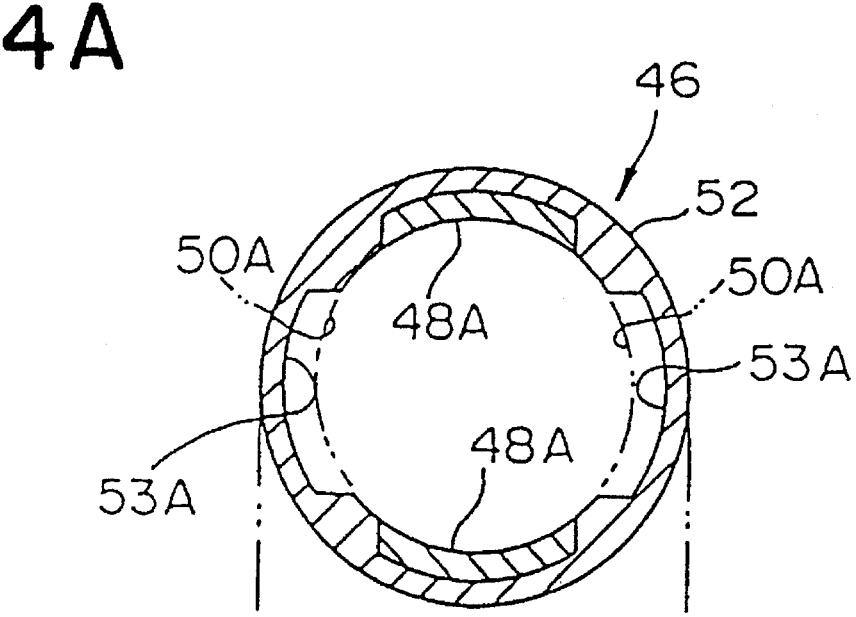
FIG. 4A is a sectional view taken at 1—1, FIG. 2 and illustrating the pole-tooth support member and the pole teeth in accordance with the first embodiment.
Figure 4B:
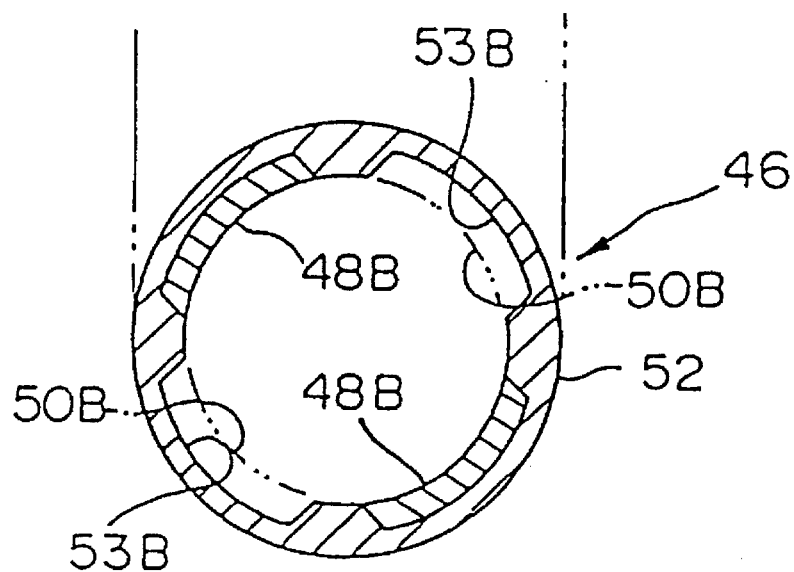
FIG. 4B is a sectional view, similar to FIG. 4A and taken at 2—2, FIG. 2.

As shown in FIGS. 4A and 4B, the long pole teeth 48A and 48B of the cylindrical member 46 are made apart from each other by 180°. In the pole-tooth support member 52, pole-tooth housing sections 53A and 53B, into which short pole teeth 50A and 50B of the yoke 34 are inserted, are formed between the long pole teeth 48A and between the long pole teeth 48B, respectively. The long pole teeth 48A (or 48B) and the pole-tooth housing section 53A (or 53B) in the same phase are made out of phase by 90°, and a gap of a fixed width is provided therebetween. The pole teeth 48A is out of phase by 45° from the pole teeth 48B on the B side, and the pole-tooth housing section 53A, on the A side, is made out of phase by 45° from the pole-tooth housing section 53B on the B side, a fixed gap being provided therebetween. When the short pole teeth 50A and 50B are inserted into the pole-tooth housing sections 53A and 53B, the long pole teeth 48A and 48B are brought into contact, without gap, with the pole-tooth contact surfaces 30A of the flange section 30 of the bobbins 26A and 26B. The long pole teeth 48A and 48B, and the short pole teeth 50A and 50B have the same thickness and width, and the areas of the above pole teeth, in which the pole teeth face the magnet 22, are equal.

In the pole-tooth support member 52 of this embodiment, the pole-tooth housing sections 53A and 53B are formed on the inner peripheral surface of the pole-tooth support member 52, and the inner peripheral surfaces of the long pole teeth 48A and 48B are flush with the inner peripheral surface of the pole-tooth support member 52. Consideration is given to making the amount of gap between the magnet 22 and each of the pole teeth as small as possible. However, the present invention is not limited to this embodiment. The long pole teeth 48A and 48B and the pole-tooth housing sections 53A and 53B may be formed around the outer peripheral surface of the pole-tooth support member 52, or pole-tooth housing slits into which the long pole teeth 48A and 48B and the short pole teeth 50A and 50B are inserted may be formed in the central portion of the peripheral wall of the pole-tooth support member 52 along the thickness thereof.

Although four pole teeth in the same phase are used in this embodiment, the pole teeth of the present invention are not limited to four pole teeth and other number of pole teeth may be used. Regarding the material of the case 44, it is preferable that a non-magnetic material be used by which a structural strength can be secured, ease of assembly, capable of holding housed parts firmly at a predetermined place, can be secured, for example, a technique such as crimping, can be used.

As shown in FIG. 1, support members 40A and 40B are placed outside the bobbins 26A and 26B (on the side opposite to the magnet 22). The support members 40A and 40B are shaped in a circular cylinder having a center hole. Press-fitting recesses 42 are formed coaxial to the center line on the side opposite to the bobbins 26A and 26B. The projections 28 of the bobbins 26A and 26B are press-fitted in to the recesses 42, and the support members 40A and 40B and the bobbins 26A and 26B are positioned coaxially, respectively. In the support members 40A and 40B of this embodiment, as shown in FIG. 5, a bearing housing section 45 is formed coaxially in the rear portion of the press-fitting recess 42, so that the bearing 24 can be press fitted into the bearing housing section 45 instead of press-fitting the bearing 24 into the projection 28.

Figure 3:
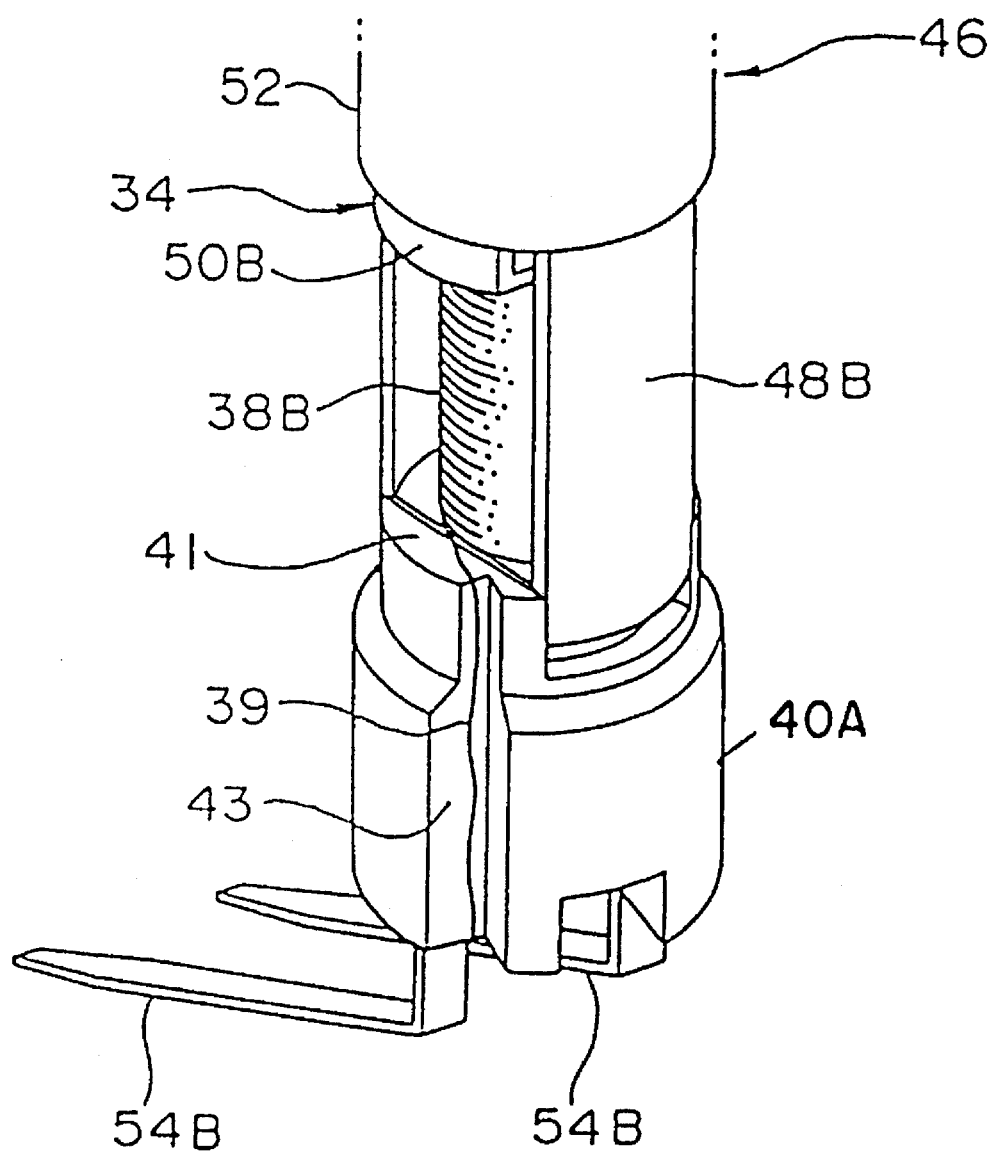
FIG. 3 is a perspective view illustrating a state in which the pole teeth, the bobbins and the support member are assembled in accordance with the first embodiment.

As shown in FIG. 2, a pair of positioning projections 41 are formed on the end surfaces of the bobbins 26B (26A) of the support members 40A (40B). As shown in FIG. 3, as a result of the side surface of the positioning projections 41 being brought into contact with the side surface of the flange section 30, the angle relative to the axis of the bobbins 26A and 26B is accurately defined. The tips of the long pole teeth 48A and 48B are also fastened between the positioning projections 41 and thus positioned. The outer peripheral surfaces of the positioning projections 41 are formed into stepped portions which are formed relatively small in size to facilitate the insertion thereof into the case 44.

As shown in FIG. 3, a pair of grooves 43, through which coated wires 39 of coils 38A and 38B are passed, are formed on the outer peripheral surfaces of the support members 40A and 40B. Terminals 54A and 54B are buried in the support members 40A and 40B, respectively, the coated wires 39 are connected to these terminals, respectively, and the terminals 54A and 54B are bent toward the same side as shown in FIG. 1. This is for the purpose of fixing all the terminals 54A and 54B to a printed board in common use.

According to the stepping motor constructed as described above, because all the long pole teeth 48A and 48B are fixed to the cylindrical pole-tooth support member 52 beforehand, while the short pole teeth 50A and 50B are inserted into the pole-tooth support member 52, all the pole teeth are positioned on the outer periphery of the magnet 22, making it possible to increase the accuracy of positioning between the pole teeth on the outer periphery of the magnet, and enhance the roller rotation accuracy.

Because the long pole teeth 48A and 48B are fixed to the pole-tooth support member 52 beforehand, while the short pole teeth 50A and 50B which are difficult to be molded integral with the pole-tooth support member 52, because their dimensions are small, are formed into one part as a yoke and mounted in the tips of the bobbins 26A and 26B, the short pole teeth 50A and 50B of the yoke 34 can be inserted into the grooves 53A and 53B of the pole-tooth support member 52, while holding the bobbins 26A and 26B, during motor assembly, and at the same time the long pole teeth 48A and 48B can be brought into contact with the pole-tooth contact surfaces 30A of the bobbins 26A and 26B. Therefore, positioning is possible by a simple and easy operation, and ease of assembly operation and productivity can be increased.

The tips of the bobbins 26A and 26B are inserted into the through hole of each yoke 34 and these tips are crimped to form the engagement section 33, after which the yoke 34 is fastened between the flange section 32 and the engagement section 33 and fixed. Therefore, this embodiment has the advantage that assembly is simple, costs are low, and the angle of the yoke 34 can be adjusted, as desired.

Because the press-fitting projections 28, formed in the end portions of the bobbins 26A and 26B, are press-fitted into the press fitting recesses 42, formed in the end portions of the support members 40A and 40B, in order to position the bobbins 26A and 26B, and the support members 40A and 40B, relatively to each other, and the bearing 24 is press-fitted into the press-fitting projection 28 and positioned coaxially, and the support members 40A and 40B are fixed in the cylindrical case 44, it is easy to align the bobbins 26A and 26B with the shaft 20 with a high degree of accuracy. Further, the air gap between the pole teeth 48, 50, and the magnet 22 can be maintained constant, and the magnetic balance can be kept uniform, as a result of the connection of the bobbins 26A and 26B with the pole teeth 48 and 50 being secured. Based on the above, it is possible to increase the roller rotation accuracy.

In this embodiment, because the bearings 24 are fixed inside the press-fitting projections 28 of the bobbins 26A and 26B, it is possible to secure a long distance from the end portion of the stepping motor to the bearing 24. The effect of reducing noise and vibrations, generated by the bearing 24, is high and it is difficult for the heat generated, when the terminals 54A and 54B are soldered and a substance, such as a paste, to propagate to the bearing 24. Therefore the risk that the performance of the bearing deteriorates due to the influence of heat and the effect of the chemical substance is small. Further, because the positioning projections 41 are formed in the support members 40A and 40B, the angle adjustment of the bobbins 26A and 26B becomes easy, thereby increasing ease of assembly.

The present invention is not limited to this embodiment described above. Of course, the construction may be changed as required, for example, as will be described below.

In the first embodiment, as shown in FIGS. 1 and 2, a case is described in which the short pole teeth 50A and 50B of the yoke 34 are brought into contact with the jaw portion 52 provided on the inner peripheral surface of the pole-tooth support member 52 so that the pole-tooth support member 52 is positioned. However, in this case, when the short pole teeth 50A and 50B of the yoke 34 are inserted into the pole-tooth support member 52, chips might be caused from the inner peripheral surface of the pole-tooth support member 52 due to the sliding contact between the inner peripheral surface of the pole-tooth support member 52 and the outer peripheral surface of the short pole teeth 50A and 50B. When these chips are present between the jaw portion 52 of the pole-tooth support member 52 and the short pole teeth 50A and 50B, poor positioning accuracy of the pole-tooth support member 52 results. This problem is solved by a second embodiment described below.

Figure 7:
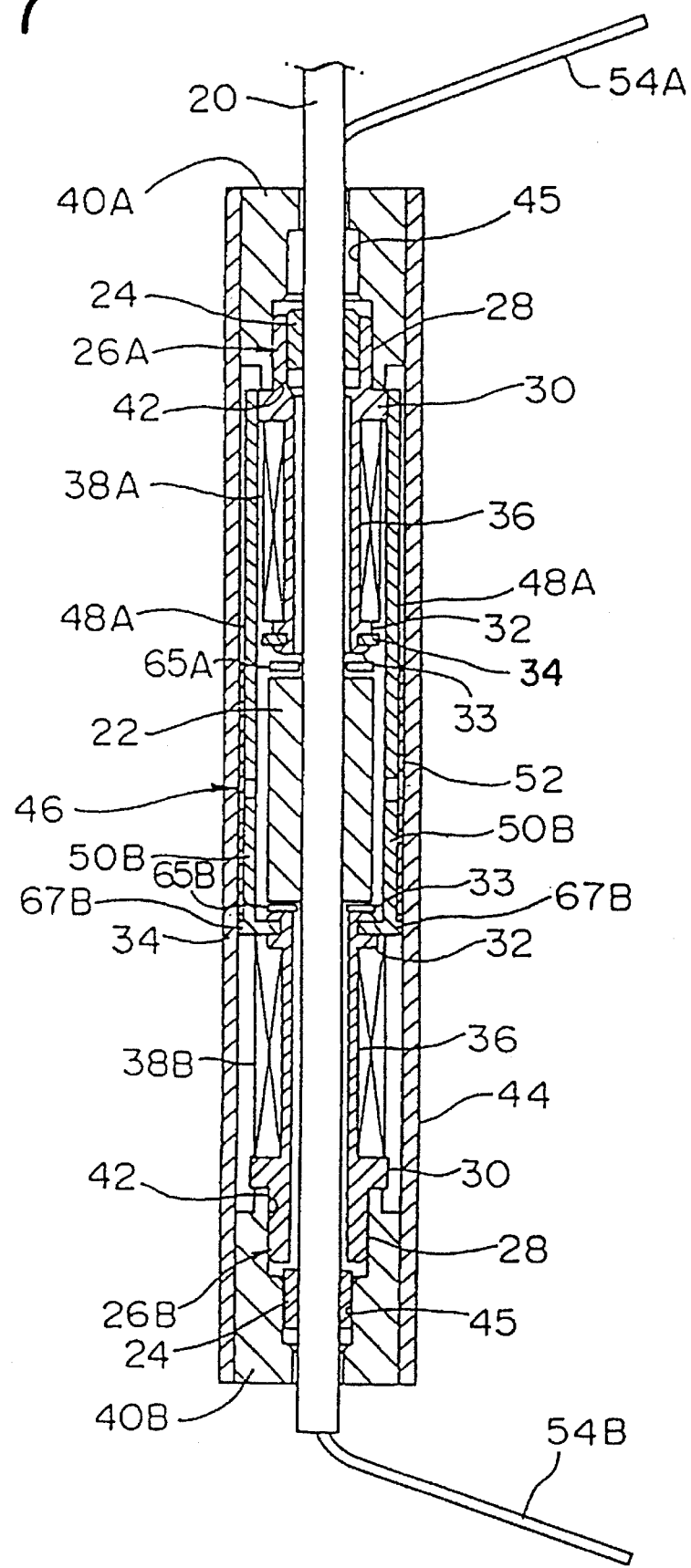
FIG. 7 is a longitudinal sectional view illustrating a second embodiment of a stepping motor in accordance with the present invention.

FIG. 7 is a longitudinal sectional view illustrating the second embodiment of a stepping motor in accordance with the present invention. Components which are the same as those of the first embodiment are given the same reference numerals.

As shown in FIGS. 7 and 8, in place of the jaw portion 52 (see FIGS. 1 and 2), flange sections 67B (the flange sections 67A is not shown), positioned as end surface of the pole-tooth support member 52 is brought into contact therewith, are disposed on the outer peripheral surface in the bottom wall portion of the yoke 34. As a result, in a case in which the stepping motor is assembled, when the short pole teeth 50A and 50B of the yoke 34 are inserted into the pole-tooth support member 52, the end surface of the pole-tooth support member 52 is brought into contact with the flange sections 67A and 67B and axially positioned.

Next, a description will be given of a method of assembling a stepping motor in accordance with a second embodiment of the present invention.

Figure 14:
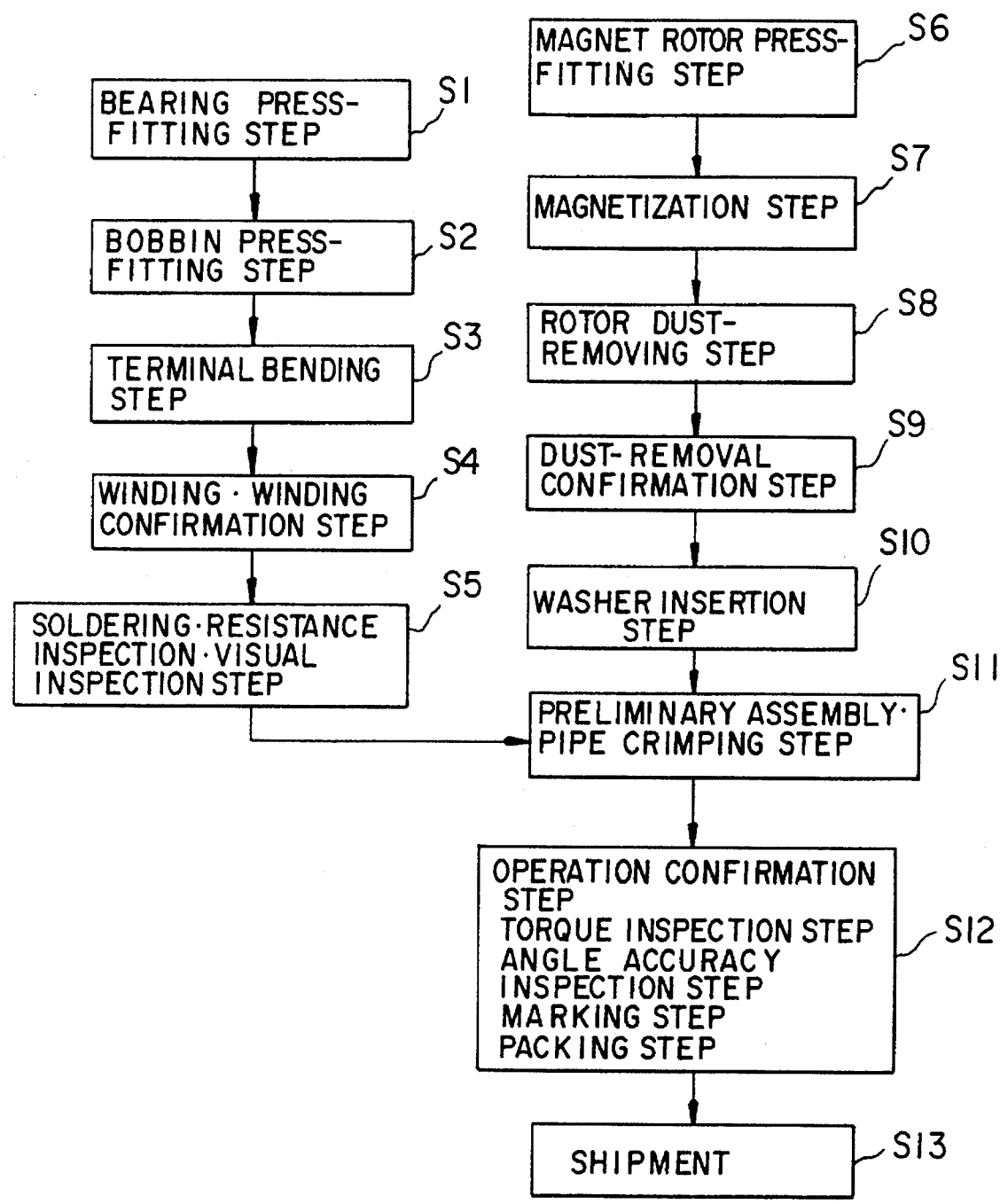
FIG. 14 is a flowchart illustrating the sequence of assembling a stepping motor of the second embodiment.
Figure 15:
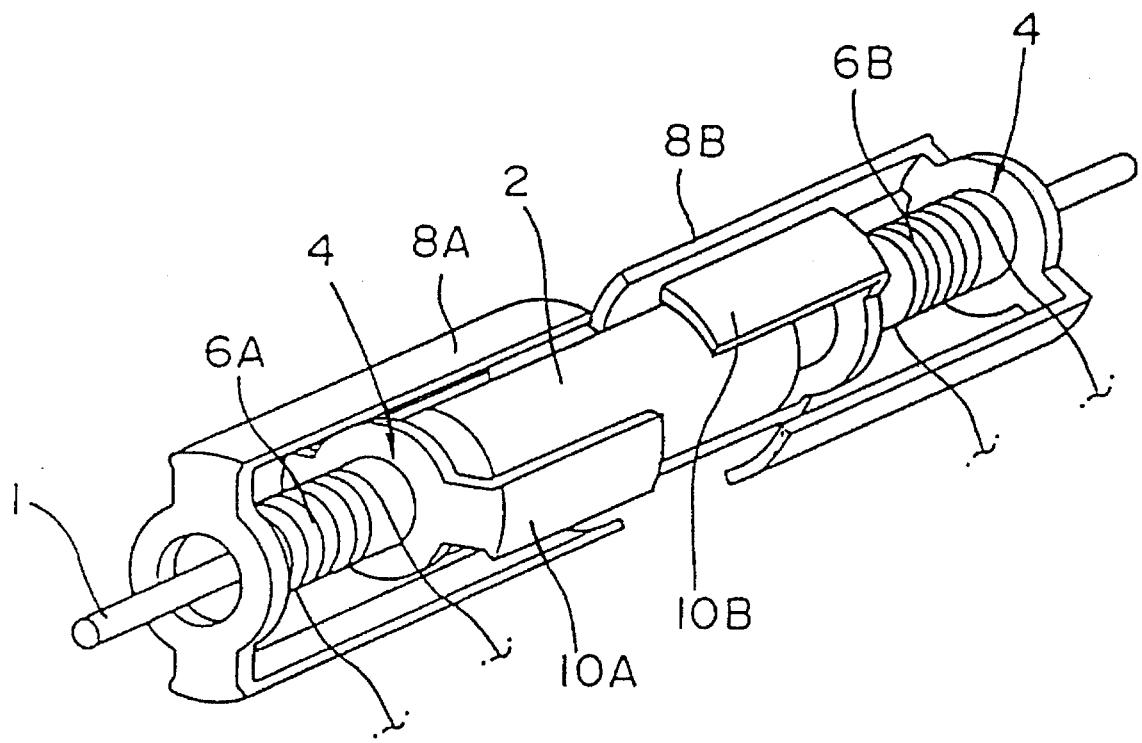
FIG. 15 is a perspective view illustrating a conventional stepping motor.

First, as shown in FIG. 7, the bearing 24 is press-fitted into the bearing housing section 45 of a support member 40B (see step S1 in FIG. 14). As shown in FIG. 8A, when the press-fitted projection 28 of the bobbin 26B is moved in the direction of the arrow and press-fitted into the support member 40B, the state shown in FIG. 8B is formed (step S2). At this time, the projection 28 is press-fitted so that the Z portion in FIG. 8A is out of phase from the short pole tooth 50B by 90°. As shown in FIG. 8C, two terminals 54B are bent (step S3). At this time, attention should be paid so that the terminals 54B will not be deformed or strained.

Figure 9A:
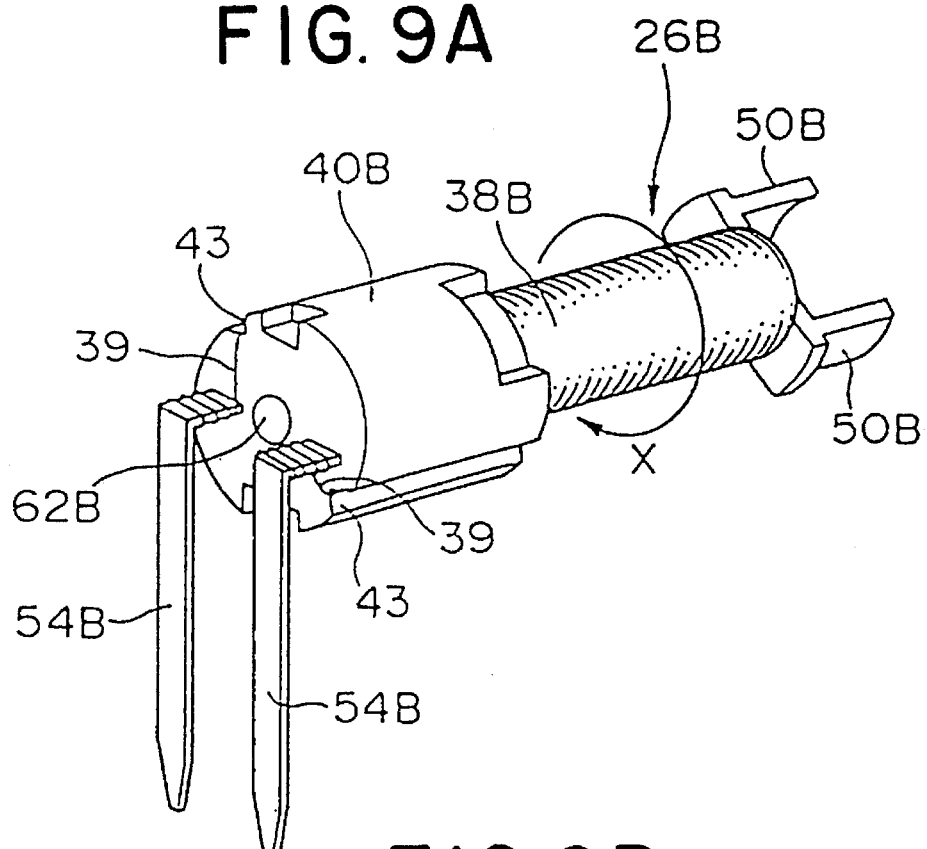
FIGS. 9A and 9B are illustrations of a winding step and a soldering step when a stepping motor of the second embodiment is assembled.
Figure 9B:
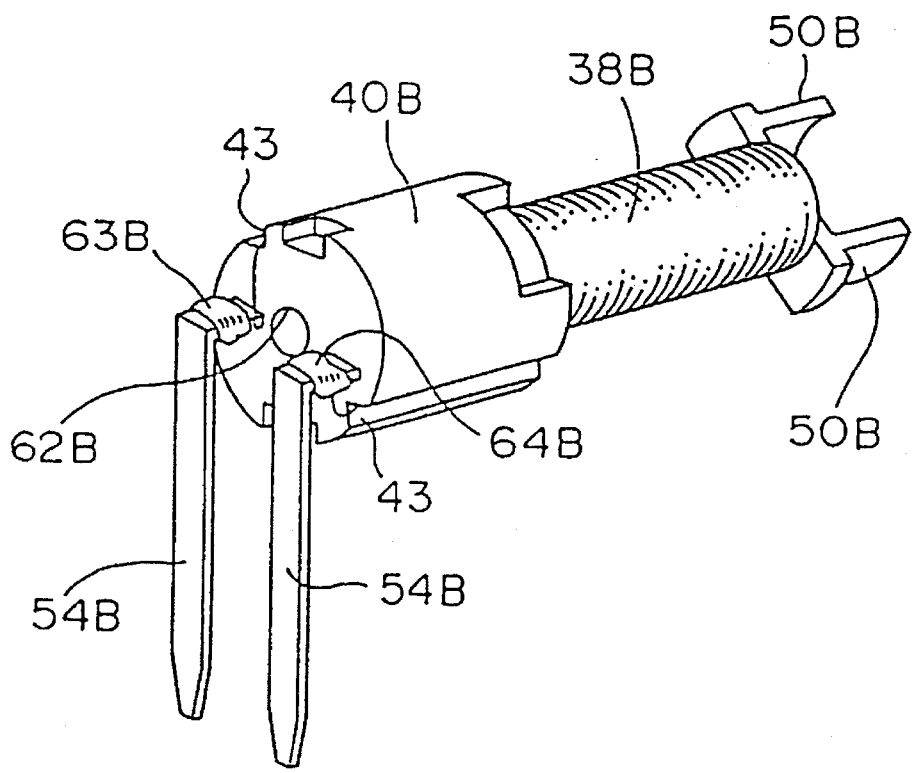

Thereafter, as shown in FIG. 9A, a coil 38B is wound around the winding portion of the bobbin 26B, and the two end portions 39 are passed through the grooves 43 of the support member 40B and wound around the terminals 54B, respectively (step S4). The direction in which the coil 38B is wound is indicated by the arrow X, FIG. 9A. At this time, attention should be paid so that the coil 38B will not be cut off or loosened. As shown in FIG. 9B, the two end portions of the coil 38B are soldered to the terminals 54B as indicated by the arrows 63B and 64B (step S5). At this time, attention should be paid so that the solders 63B and 64B and paste will not be scattered into a shaft through hole 62B. Continuity, after soldering, is checked, and a visual inspection is conducted for adherence of foreign matter, or the like. In the above-described way, a bobbin assembly is obtained.

Figure 10A:
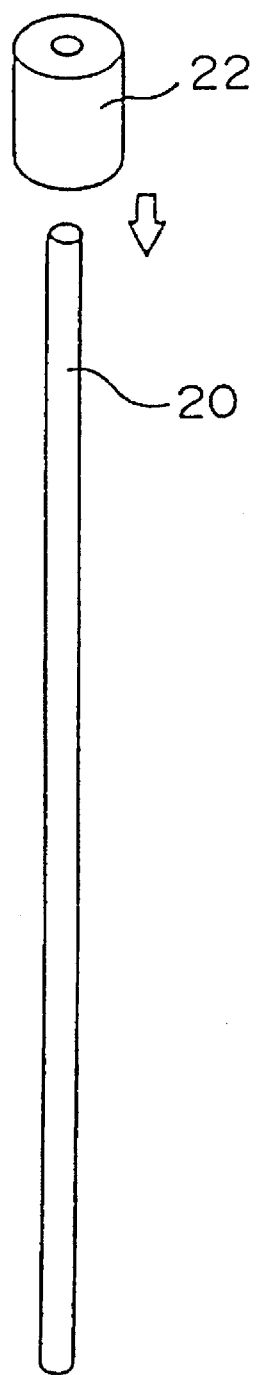
FIGS. 10A and 10B are illustrations of a magnet press-fitting step and a washer insertion step, respectively, when a stepping motor of the second embodiment is assembled.
Figure 10B:
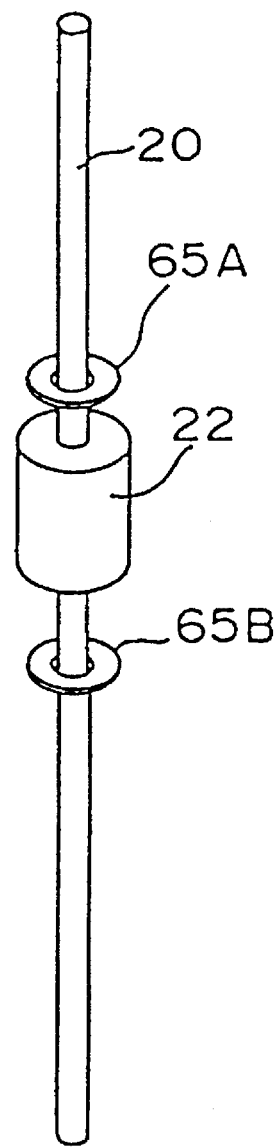

In parallel with the above steps S1 to S5, as shown in FIG. 10A, the magnet 22 is press-fitted into the shaft 20 (step S6) and it is confirmed that the shaft 20 is not bent, the magnet 22 is not cracked or chipped, and no foreign matter is adhered. Then, the steps of magnetizing the magnet 22 (step S7), removing dust from the magnet 22 (step S8), and confirming the removal of dust (step S9), are performed in sequence. As shown in FIG. 10B, the washers 65A and 65B are inserted onto the shaft 20 from opposite sides of the magnet 22, thus obtaining a rotor assembly (step S10).

Figure 11A:
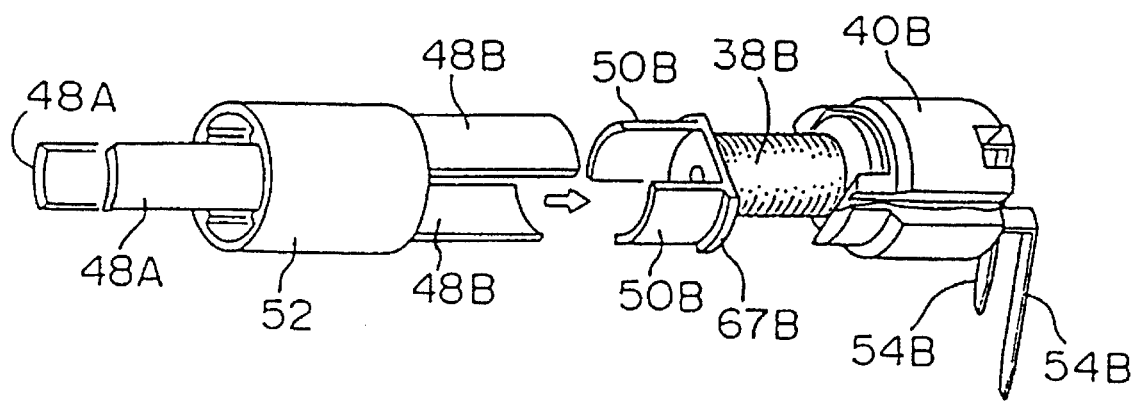
FIGS. 11A, 11B and 11C are illustrations of steps for mounting a pole assembly in a bobbin assembly when a stepping motor of the second embodiment is assembled.
Figure 11B:
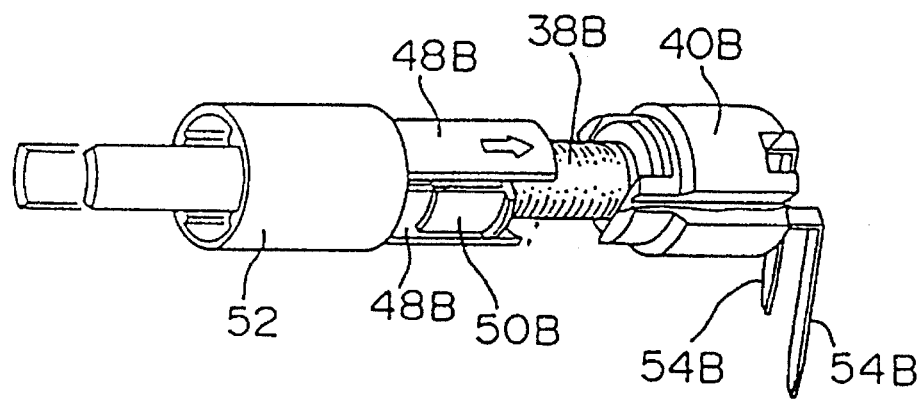
Figure 11C:
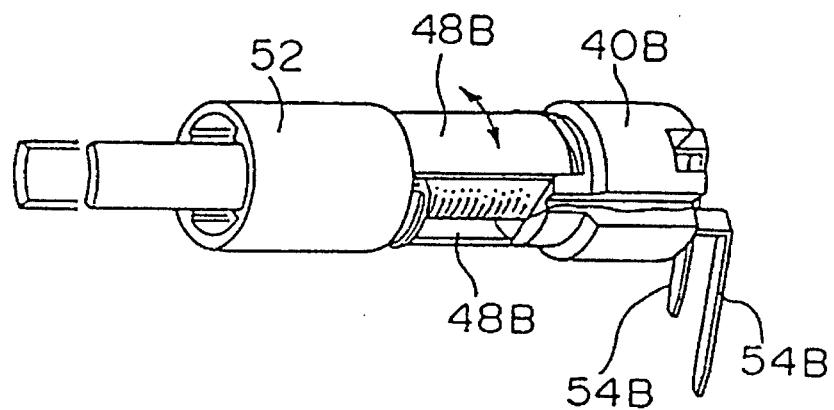

Thereafter, as shown in FIG. 11A, a pole assembly formed of the pole-tooth support member 52 and four long pole teeth 48A, 48B are moved in the direction of the arrow. After the state shown in FIG. 11B is reached and, as shown in FIG. 11C, the end surface of the pole-tooth support member 52 is brought into contact with the flange section 67B of the short pole tooth 50B and positioned axially. At this time, attention should be paid so that the coil 38B will not be cut off. At this point, it is confirmed as indicated by the arrow, FIGS. 11A, 11B, that the pole assembly is not rotated irregularly. In this way, a coil and a pole assembly are obtained.

Figure 12A:
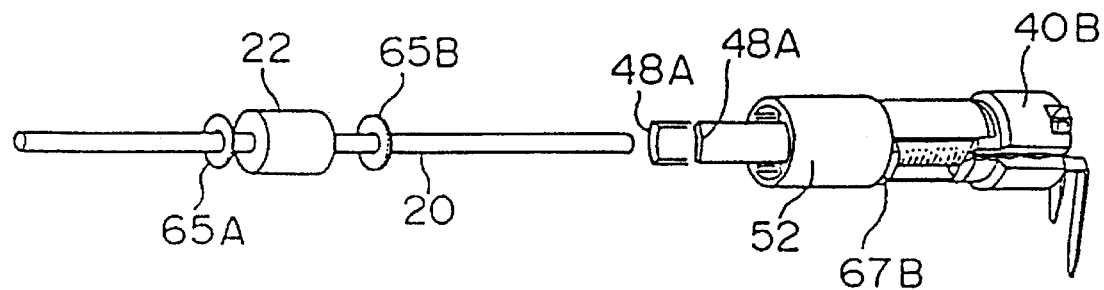
FIGS. 12A, 12B, 12C and 12D are illustrations of steps for mounting a pole assembly in a bobbin assembly and for covering a pipe when a stepping motor of the second embodiment is assembled.
Figure 12B:
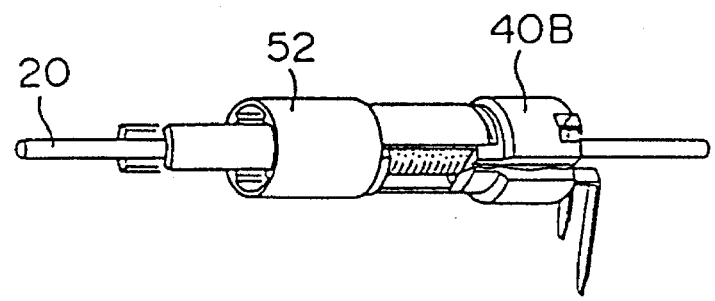
Figure 12C:
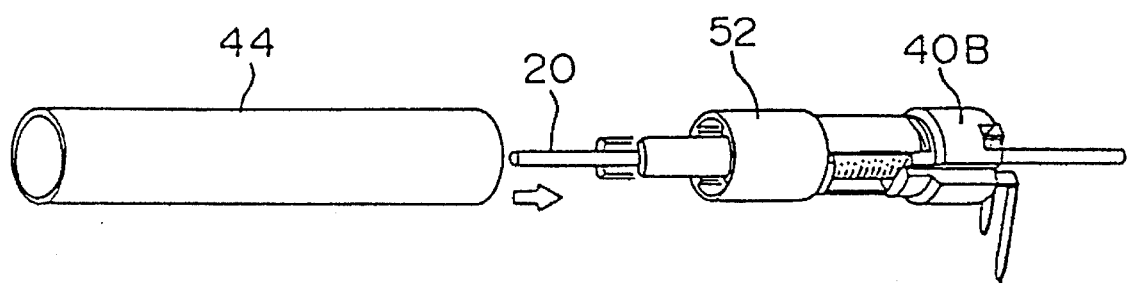
Figure 12D:
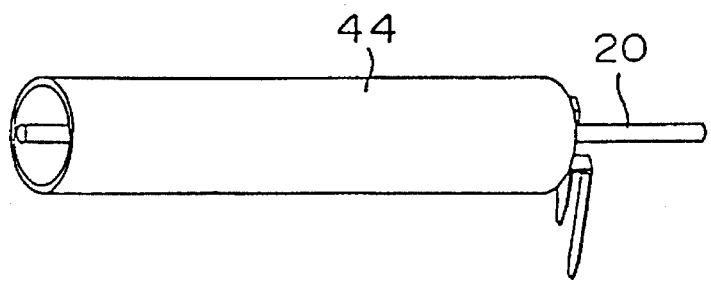

Next, as shown in FIG. 12A, the rotor assembly is inserted into the coil and the pole assembly, and thus a assembly shown in FIG. 12B is obtained. Here, attention should be paid so that the magnet 22 is not chipped or damaged, that the pole assembly is securely held because the pole assembly and the magnet 22 attract each other, and further that the washers 65A and 65B will not be displaced from the shaft 20. As shown in FIG. 12C, the cover 44 is covered on the assembly from one end of the cover, and the assembly shown in FIG. 12D is reached.

Figure 13A:
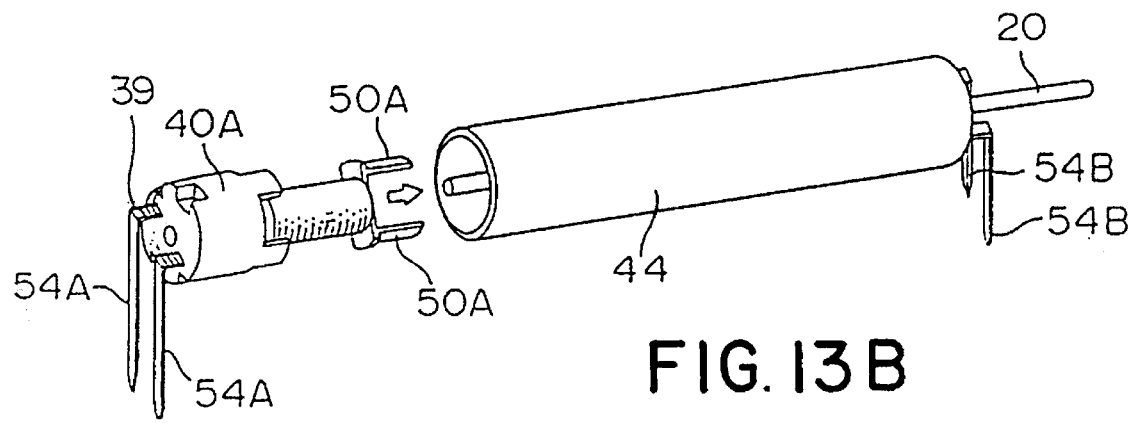
FIGS. 13A, 13B and 13C are illustrations of bobbin assembly insertion steps and a pipe crimping step when the stepping motor of the second embodiment is assembled.
Figure 13B:
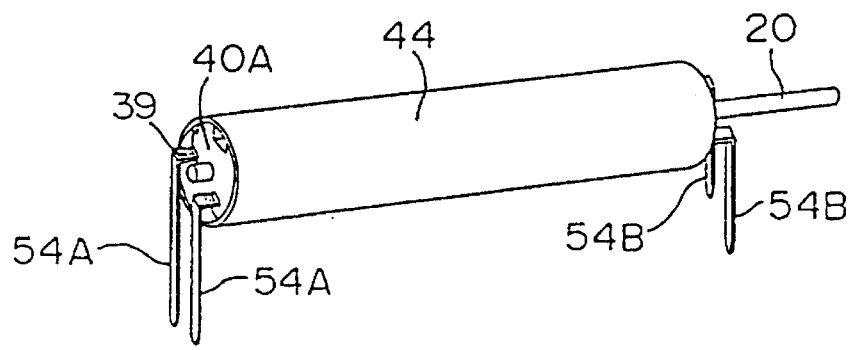
Figure 13C:
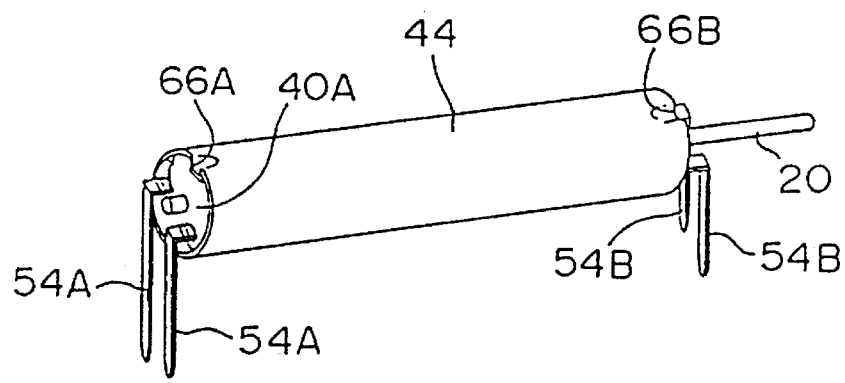

Thereafter, as shown in FIG. 13A, another bobbin assembly is inserted from the other end of the cover 44 so that the direction of terminals 54A becomes the same as that of the terminals 54B, and, thus, an assembly shown in FIG. 13B is obtained. At this time, it is confirmed that the support member 40A (the other support member is not shown) at both ends does not protrude from the end of the cover 44. As shown in FIG. 13C, the two end portions of the cover 44 are crimped at two places (a total of four places) as indicated by reference numerals 66A and 66B (see step S11 in FIG. 14). At this point, it is confirmed that the support member 40A (the other support member is not shown) is securely fixed and further that the thrust backlash of the shaft 20 is kept within a defined value and the shaft 20 is rotated smoothly.

Finally, the steps, including operation confirmation, torque confirmation, angle accuracy inspection, marking, and packing, are performed (step S12), after which the stepping motor is shipped (step S13).

Although the above-described embodiments describe an example in which bobbins and yokes are molded separately, after which the bottom plate portion of the yoke is fixed to the bobbin, the present invention is not limited to this example, and the bobbins and yokes may be monolithically molded.

According to the stepping motor of the present invention, as described above, because all the long pole teeth are fixed to a pole-tooth support member beforehand, while the short pole teeth are inserted into the pole-tooth housing section formed in the pole-tooth support member, all the pole teeth can be positioned accurately relative to each other. Therefore, it is possible to increase the accuracy of positioning between the pole teeth on the outer periphery of a magnet, and increase the rotor rotation accuracy.

Further, the long pole teeth are fixed to a pole-tooth support member beforehand, while short pole teeth, which are difficult to be molded integral with the pole-tooth support member because their dimensions are small, are formed into one part as a yoke and fixed to the tip of the bobbin. As a result, during the assembly of a motor, it is possible to insert short pole teeth of the yoke into the pole-tooth housing section, while holding the bobbin, and to connect the long pole teeth to the base end portion of the bobbin. A high level of positioning is possible by a simple and easy operation, making it possible to increase the ease of assembly operations and productivity and decreases costs.

What is claimed is:

1. A stepping motor, comprising:

a shaft having a magnet fixed coaxially thereon;

a pair of bobbins, of soft magnetic material, positioned coaxially to said shaft at opposite ends of said magnet along the axis thereof;

A-phase and B-phase coils wound around the bobbins, respectively;

yokes, having bottom plate portion fixed to the end portion of each said bobbins on the magnet side, having short pole teeth facing a part of the outer peripheral surface of said magnet;

long pole teeth, of a soft magnetic material, having one end releasably connected to an end portion of each of said bobbins on a side opposite to said magnet and an other end facing an outer portion of an outer peripheral surface of said magnet; and pole-tooth support members, of a non-magnetic material, coaxially placed so as to surround said outer peripheral surface of said magnet, wherein all said long pole teeth are integrally fixed to said pole-tooth support members, while said short pole teeth are releasably respectively inserted into the pole-tooth housing sections formed in said pole-tooth support members, respectively.

2. A stepping motor according to claim 1, wherein a through hole is formed in the center of said bottom plate portion of each of said yokes, the end portion of each bobbin on said magnet side is inserted into the through hole on said magnet side, and a pair of engagement sections radially protrude outward, are formed in said end portion, of each bobbin, so that the bottom plate portions of said yokes are fixed perpendicular to the axis of the bobbin by means of said engagement sections.

3. A stepping motor according to one of claims 1 and 2, wherein flange sections with which said pole-tooth support member are brought into contact are positioned on outer peripheral surfaces of said yokes.

* * * * *